United States Patent

[11] 3,600,860

[72] Inventor Warren Harding Liepold
 134 Liberty St., Pawcatuck, Conn. 02891
[21] Appl. No. 841,407
[22] Filed July 14, 1969
[45] Patented Aug. 24, 1971

[54] ADJUSTABLE ANGLE HELIX GENERATOR FOR EDGE AND RADIAL RELIEF SHARPENING
25 Claims, 8 Drawing Figs.

[52] U.S. Cl. .................................................. 51/232, 51/95
[51] Int. Cl. .................................................. B24b 47/02
[50] Field of Search .................................................. 51/232, 225, 95, 95 LR, 123

[56] References Cited
UNITED STATES PATENTS
| | | | |
|---|---|---|---|
| 1,355,616 | 10/1920 | Mohn | 51/236 X |
| 2,569,855 | 10/1951 | Hertlein | 51/95 X |
| 3,117,399 | 1/1964 | Schoeppell | 51/225 X |

Primary Examiner—Travis S. McGehee
Attorney—Mattern, Ware & Davis

ABSTRACT: A variable pitch-angle helical-feed jig for supporting, advancing and retracting a supported rod or tube in combined longitudinal and rotational motion along a helical path of travel of predetermined adjustable pitch angle. the mechanism is embodied in a jig device for presenting successive cutting edges of a fluted end mill to a grinding mill for sharpening purposes, and helically traversing the end mill across the grinding face to sharpen the entire length of each cutting edge in turn. The end mill is held within a collet-type chuck that tightens its grip when telescoped within an inner tube which in turn is held inside a carrier tube. The inner tube is rotatable relative to the carrier tube for angularly indexing the end mill so as to present successive cutting edges thereof to the grinding wheel. The entire length of each cutting edge is helically traversed across the wheel by the action of three adjustable pitch rollers which convert manually imparted rotary or longitudinal motion of the carrier tube into a helical advance. The pitch angles of all rollers are adjusted simultaneously, so that the helical pitch of the carrier tube advance can be made equal to that of the end mill cutting edges.

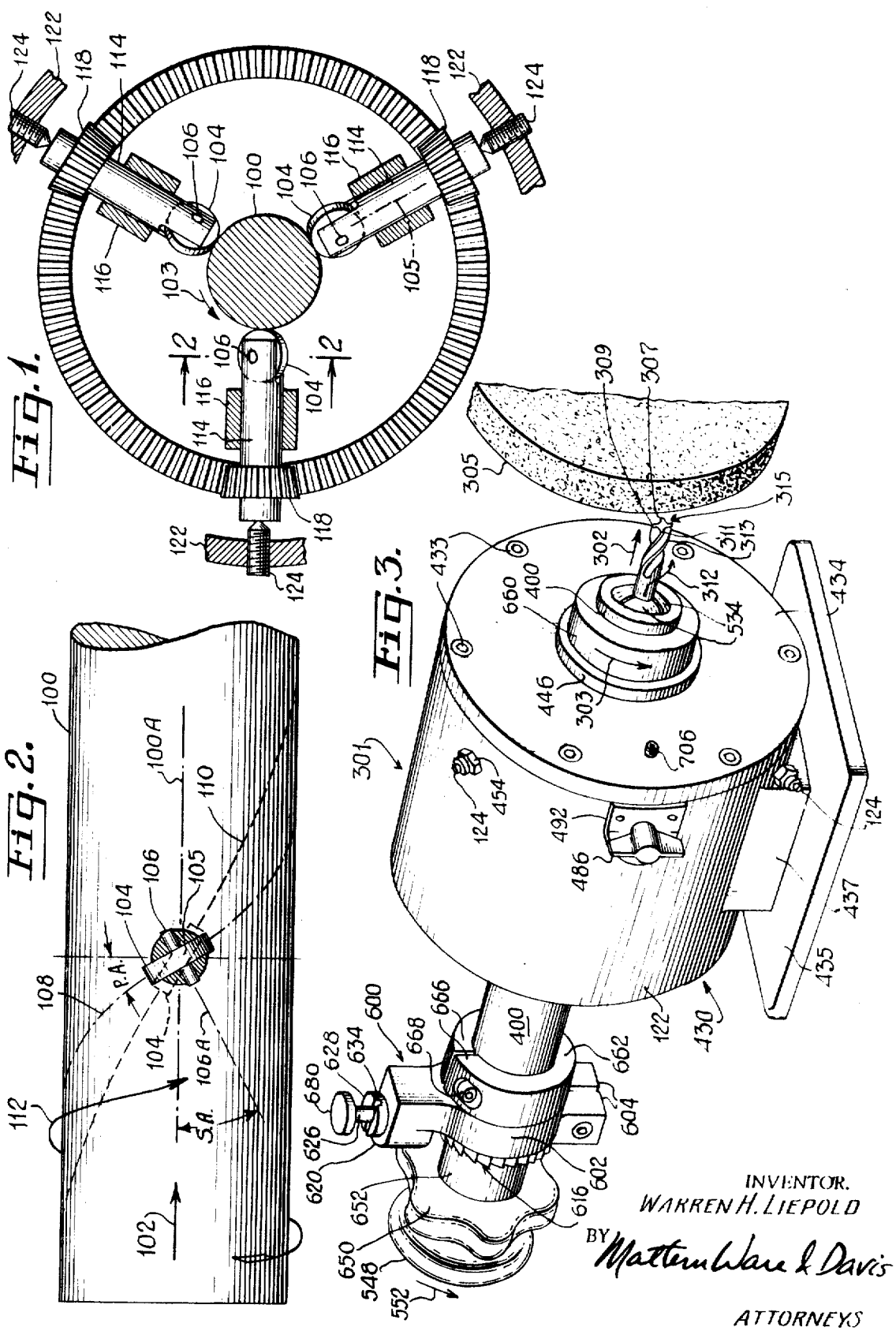

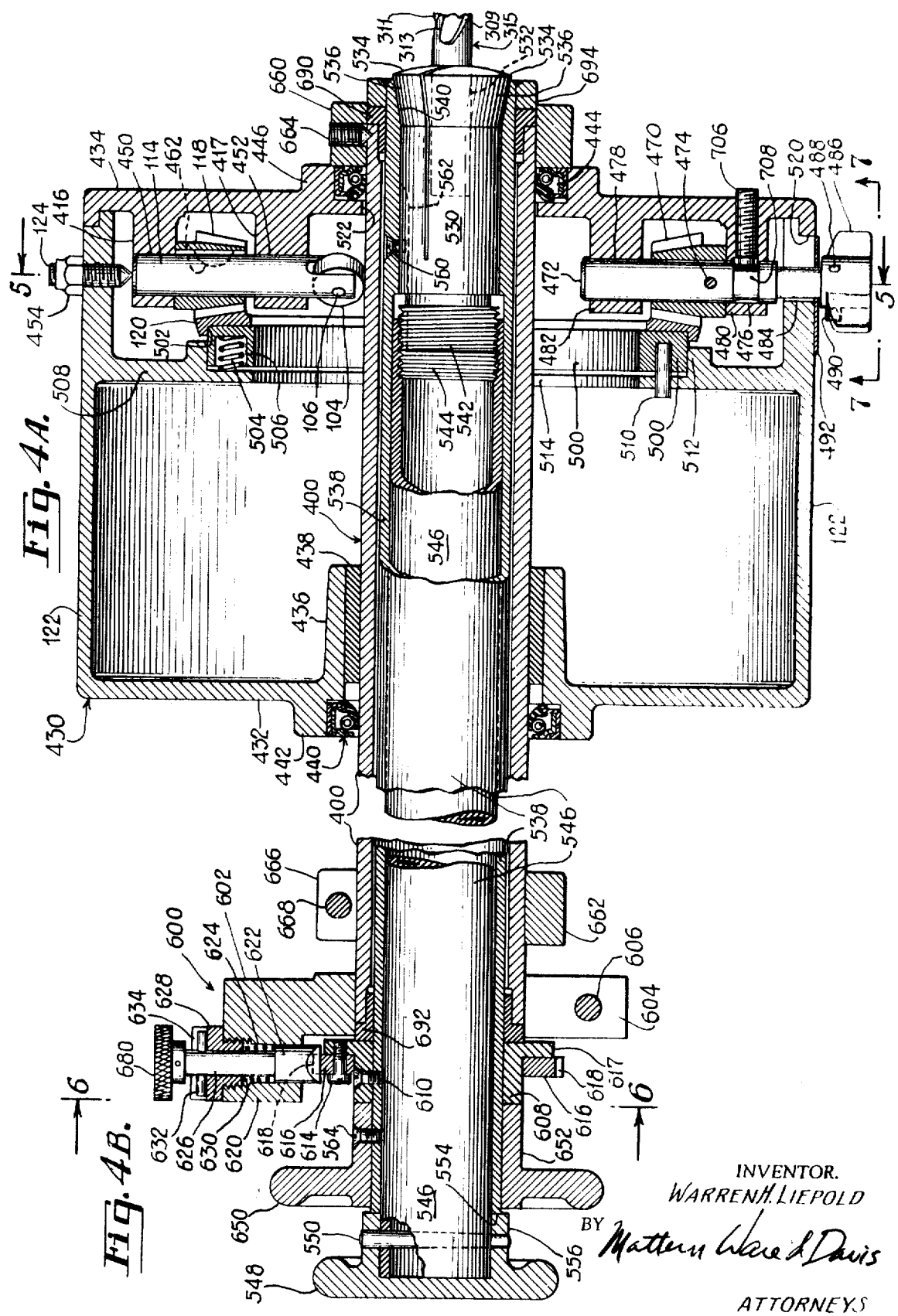

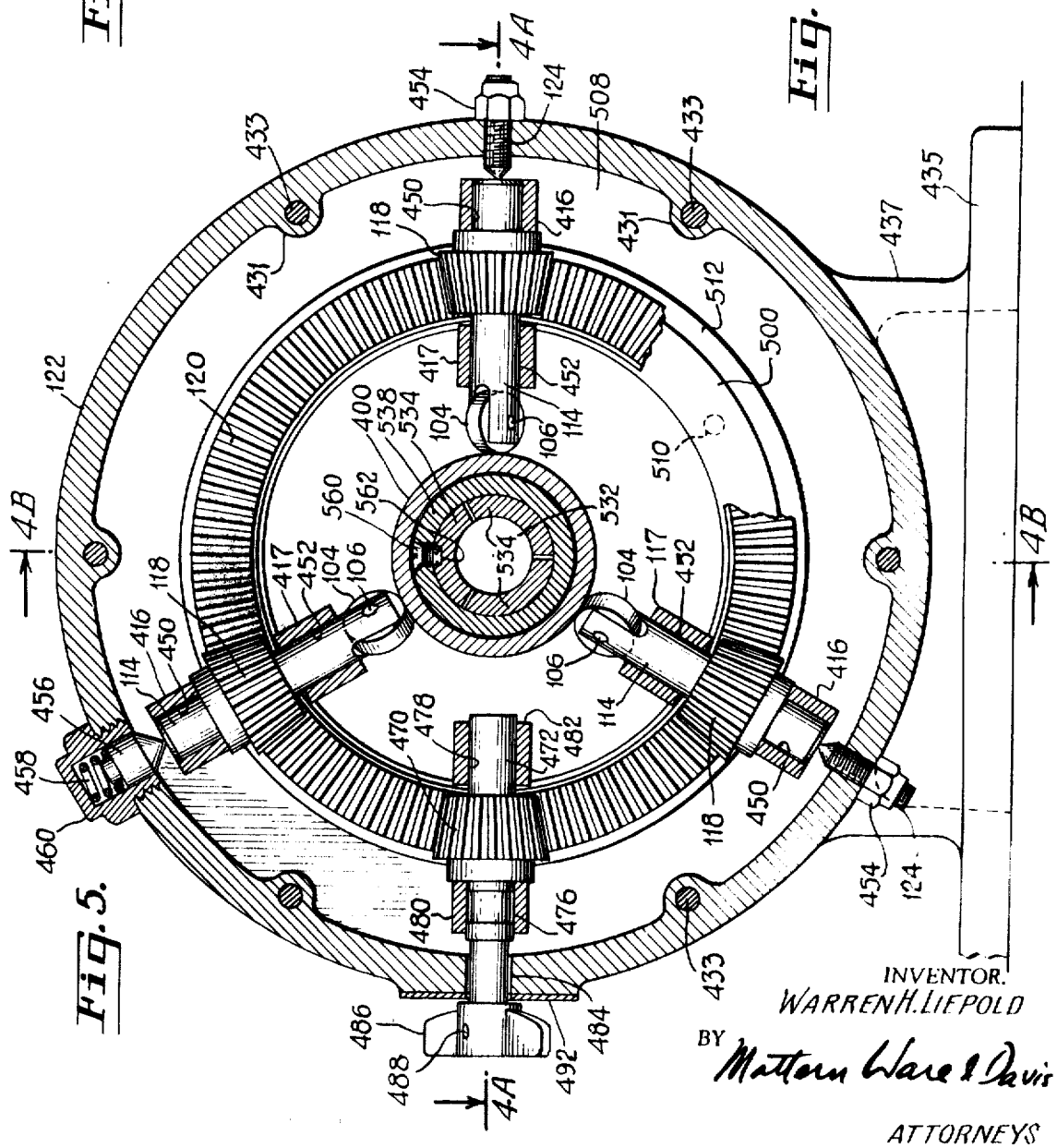

ADJUSTABLE ANGLE HELIX GENERATOR FOR EDGE AND RADIAL RELIEF SHARPENING

FIELD OF THE INVENTION

This invention relates generally to machine tools, and is particularly concerned with apparatus for use in precision sharpening of fluted end mills. It is embodied in a variable pitch-angle, helical-feed jig, incorporating a novel mechanism for producing helical traversing advance and retraction movement of the tool along a helical path having a variable helical pitch angle predetermined by the operator.

BACKGROUND OF THE INVENTION

A fluted end mill is a cutting tool which is difficult to sharpen, primarily because it has a plurality of cutting edges arranged along the edges of flutes in a helical configuration similar to an ordinary twist drill bit. In order to sharpen a tool of this type along its helical cutting edges, the mill is ordinarily placed in a jig adapted to hold the tool and advance it across the face of a grinding wheel. In order to track the helical configuration of each cutting edge as the tool is advanced axially relative to the grinding wheel, it is necessary to rotate the tool about its longitudinal axis in precise relationship to its longitudinal movement, so that the resulting helical motion of the tool proceeds at a pitch angle equal to that of the flute cutting edges, thus maintaining the same grinding orientation over the entire length of each flute cutting edge.

In the past, the art has had difficulty in achieving the desired helical motion of the tool with adequate precision. A commonly employed prior art expedient is to insert a fixed finger element within one of the helical flutes of the end mill, to guide it through a helical movement equal in pitch to the cutting edges themselves. See, for example, U.S. Pat. Nos. 3,330,073 of Siemsen and 2,569,855 of Hertlein. However this method is expensive, time consuming and not very precise, and it has resulted in spoiling many end mills, causing machine shops to put off the sharpening of milling cutters for a long time, degrading the quality of the work turned out. For these reasons, the common prior art end mill sharpening practice has been uneconomical and unsatisfactory.

Another prior art approach, seen in Melin U.S. Pat. No. 2,411,972, employs a canted roller for advancing the tool both axially and rotationally, but not at a helical pitch angle equal to that of the tool-cutting edges (e.g. Melin FIG. 2).

SUMMARY OF THE INVENTION

The present invention provides a sharpening jig designed to move the cutting tool helically past a grinding wheel or other sharpening device, along a predetermined helical path of adjustable pitch angle, without the use of guide finger, positive biasing force or other awkward techniques. The invention includes a generally cylindrical tool carrier member having means thereon which are arranged to hold the cutting tool so that its axis coincides with that of the cylindrical carrier. The carrier is appropriately mounted in a manner to permit it to move parallel to, and rotate about, its cylindrical axis. Finally, a plurality of rollers are located externally of the carrier member and spaced circumferentially about it, the rollers being mounted for rotation against the exterior of the carrier member at a helical angle relative thereto. As a result, the rollers impart a helical direction to the motion of the carrier member so as to move the cutting tool helically across a grinding wheel or other sharpening device.

The helical path is achieved with precise control of the pitch angle, which is selected to equal that of the cutting edges of the tool, so that the entire length of an edge is traversed continuously past the grinding wheel in the same grinding relation. Moreover, means may be provided for adjusting the angle of the rollers so as to accommodate the mechanism to different milling tools having different cutting edge pitch angles. A mechanism is also provided for angularly indexing the cutting tool relative to the carrier tube, so as to rotate a multiedge cutting tool for sharpening successive edges thereof.

Relative helical motion of a cylindrical body in rolling contact with a plurality of canted rollers is shown in Weber U.S. Pat. No. 3,272,021, but Weber's helical pitch is fixed and invariable.

Accordingly a principal object of the present invention is to provide novel helical feed mechanisms for advance and retraction of a workpiece along a twisted "helical traverse plane" having an adjustable pitch angle.

Another object is to provide such novel mechanisms in forms useful for sharpening jigs for grinding fluted end mills and similar cutting tools.

A further object is to provide such mechanisms incorporating angular indexing capabilities for repositioning a workpiece for advance and retraction on successive angularly displaced twisted helical traverse planes.

Another object of the invention is to provide such variable pitch helical feed mechanisms incorporating a plurality of traction rollers angularly arrayed in supporting tractive rolling engagement about the periphery of a cylindrical member, and adjustably mounted to permit their planes of rotation to be trackingly adjusted through corresponding angular positions ranging through at least 180° from first directions parallel to and including the axis of the cylindrical member through coinciding positions perpendicular to said axis to opposite second directions parallel to and including said axis.

BRIEF DESCRIPTION OF THE DRAWINGS

FIG. 1 is a schematic transverse vertical section view of the principal components of a helical advance mechanism according to the present invention, showing the way in which the helical pitch angle is adjusted.

FIG. 2 is a schematic side sectional view taken along the section lines 2—2 of FIG. 1, illustrating the effect of different adjustments of the pitch angle to accommodate the device to different milling tools.

FIG. 3 is a perspective view of a milling-tool-sharpening facility including a conventional grinding wheel and a tool holding and advancing device in accordance with this invention.

FIG. 4A is a longitudinal section through the main housing of the tool holding and advancing device of FIG. 3, taken along the section lines 4A—4A of FIG. 5.

FIG. 4B is a longitudinal section of the tailstock of the same tool holding and advancing device, taken along the section lines 4B—4B of FIG. 5. Note that FIGS. 4A and 4B share a common centerline, although FIG. 4A is a horizontal section, and FIG. 4B is a vertical section.

FIG. 5 is a transverse section taken along the lines 5—5 of FIG. 4A.

FIG. 6 is a transverse section taken along the lines 6—6 of FIG. 4B.

And FIG. 7 is a fragmentary side elevational view taken from the vantage point indicated by the lines 7—7 of FIG. 4A.

The same reference characters refer to the same elements throughout the several views of the drawing.

DETAILED DESCRIPTION OF THE PREFERRED EMBODIMENT

In order to explain the basic principle of the invention before describing the mechanical details of the illustrated embodiment, we turn first to the simplified views of FIGS. 1 and 2. There the reference number 100 designates a cylindrical member which is to be advanced axially and at the same time rotated about its axis so that the combined motions produce a resultant helical advance along a path which may be called a "twisted helical traverse plane" at a controlled pitch angle.

Arrow 102 indicates the axial direction of translation, and arrow 103 indicates the rotation, both of which are components of the helical motion of the cylindrical member 100.

A group of three rollers 104 are equally spaced circumferentially in tractive rolling engagement about the exterior surface of the cylindrical member 100. These rollers are oriented so that their axes of rotation are skewed relative to the axial direction of the cylindrical member 100 (arrow 102). As a result the rolling motion of the rollers 104 reacts against the cylindrical member 100, causing the latter to advance in a helical "rolling—" motion relative to the roller 104.

Referring to FIG. 2, roller 104 rotates about axis 106A of the roller shaft 106, and axis 106A is perpendicular to radius 105 of cylinder 100. Axis 106A and radius 105 of the cylinder 100 may be said to define a skew plane, forming an included angle of intersection or skew angle S.A. with the longitudinal axial plane of cylinder 100 by radius 105 and the cylinder's axis 100A. The corresponding helix 108 produced by this particular skew angle S.A., shown as 30° in FIG. 2, has a helix angle or pitch angle P.A. which is exactly equal to the skew angle, 30° in FIG. 2, formed between helix 108 and axial plane 100A-105.

Inspection of FIG. 2 shows that the skew angle and pitch angle are equal because their respective bounding planes are perpendicular; the diametral plane of cylinder 100 containing radius 105 is perpendicular to the longitudinal axial plane of cylinder 100 containing axis 100A and radius 105; and the plane of rotation of roller 104 containing radius 105 and tracing helix 108 on cylinder 100 is perpendicular to the definite axis of roller rotation 106A.

By changing the skew angle S.A. of rollers 104, the pitch angle P.A. of helix 108 may be varied at will. A mechanism for producing this adjustment is shown in FIG. 1.

Roller 104 thus has a contact zone of tractive rolling engagement with cylinder 100 which is elongated along a line mutually tangent to roller 104 and cylinder 100, parallel to shaft axis 106A and perpendicular to radius 105, constraining cylinder 100, as it advances axially in direction 102 along axis 100A, to roll past roller 104 in a direction perpendicular to axis 106A, and thus causing cylinder 100 to advance along the helical path 108 at a helical pitch angle P.A.

As a result, a given point on the surface on the member 100 will describe a helical track as the member 100 moves both axially and rotationally. For example, for the specific relationship illustrated between the axial arrow 102 and the rollers 104 illustrated by the solid lines in FIG. 2, a particular point on the surface of cylindrical member 100 will describe a helical path 108. On the other hand, if the rollers 104 were rotated to roll on the outer surface of the cylindrical member 100 at a shallower pitch angle, as indicated by the dashed line representation of roller 104 in FIG. 2, then a given point on the surface of the cylindrical member 100 would describe a shallower helical track 110. Alternatively, if the rollers 104 were set at a steeper rolling angle, a given point on the surface of the cylindrical member 100 would described a steeper helical track 112. The helical tracks 108, 110 and 112 may be considered the helix lines where the cylindrical surface of member 100 intersects the "twisted helical traverse planes " (resembling twisted flat ribbons) determined by the adjusted pitch angle of rollers 104.

Thus, the pitch of the helical advance of the cylindrical member 100 may be controlled by the angle between the rotation planes of each of the rollers 104 and the axial arrow 102. In order to select the desired helical pitch angle, therefore, the roller shafts 106 are journaled in cylindrical holder members 114, and the latter members in turn are rotatably received within diagrammatically illustrated journal blocks 116 so as to rotate about their longitudinal axes. Each of the holder members 114 is surrounded annularly by a pinion 118 which is affixed to the associated holder member for rotation therewith. The rotational movement of the holder members within the journal blocks 116 serves to rotate the roller shafts 106 and hence the axis of rotation of the rollers 104 through a range of angles relative to the axial arrow 102, and the pinions 118 provide a convenient means for rotating the roller holders 114 in order to accomplish this.

All the rollers 104 must have the same helical rolling angle relative to the cylindrical member 100, in order for them to cooperate with each other. Therefore they are initially set at a common helical angle relative to axial arrow 102, and their pinions 118 are then all meshed with a common ring gear 120 which serves the dual purpose of keeping all the rollers 104 at a common helical angle and providing a common drive mechanism for simultaneous adjustment of that helical angle. Thus, any rotation imparted to the ring gear 120 about an axis parallel to arrow 102 will cause all three pinions 118 to rotate their holder members 114, shafts 106 and rollers 104. Since the helical angle at which all three rollers 104 are set is equal to begin with, and since a given rotation of the common ring gear 120 imparts equal angular displacements to all three of the pinions 118, the resulting adjustment of the helical angle will be equal as to all three rollers 104, thus preserving the equiangular relationship amongst the three rollers over the range of adjustment.

FIG. 1 also illustrates a mechanism for radial adjustment of the roller holders 114 in order to align pinions 118 with the ring gear 120, as well as to equalize the radial thrust exerted upon cylindrical member 100 by the three rollers 104. This mechanism includes setscrews 124 threaded through tapped holes in an outer casing 122 and making a point contact with the outer end surfaces of the holder members 114. The setscrews 124 are advanced to urge the roller holders 114 radially inward until the pinions 118 mesh with the ring gear 120 and the rollers 104 engage the surface of the cylindrical member 100.

Thus in connection with FIGS. 1 and 2 there has been described the general principle of a mechanism in accordance with this invention for correlating axial and rotational movement of a cylindrical member so as to cause it to advance in a helical motion at a precise pitch angle which is adjustable by means of a ring gear. For the specific application of this principle to a device for holding a milling tool and traversing each of its cutting edges helically across the face of a grinding wheel at the pitch of the cutting edges, we turn to the fully detailed mechanical drawings of FIGS. 3 through 7.

FIG. 3 shows the machinery of this invention, generally designated 301, as it holds ta milling tool 315 just prior to traversing one cutting edge of it across a conventional grinding wheel 305. At the moment represented in FIG. 3, a particular cutting edge 307 of the cutting tool 315 is in position to be sharpened in this manner. The traversing movement, in order to track the helical contour of the cutting edge, must include an axial component represented by arrow 302 and a simultaneous rotational component represented by arrow 303. Moreover, the relative magnitudes of these components of the motion of the milling tool 315 must be such that the pitc.. angle of the resulting helical motion, represented by the arrow 312, is always equal to the pitch angle of the helical cutting edges 307, 309, 311 and 313 of the milling tool. However, the pitch angle of the helical motion represented by arrow 312 must be adjustable in order to accommodate another milling tool, the helical cutting edges of which have a different pitch. Thus the principle described above in connection with FIGS. 1 and 2 is employed in the device 301 to achieve a precise helical pitch angle for the traversing motion of a milling tool 303, and also to permit accurate adjustment of that pitch angle to accommodate the machine to different milling tools.

Referring next to FIGS. 4 through 7 as well as FIG. 3, it is seen that the milling tool 315 is carried, by means of a mechanism subsequently described, upon a carrier tube 400 of generally cylindrical shape, which corresponds to the cylindrical member 100 of FIGS. 1 and 2 in that it can be helically advanced at a desired pitch angle by means of the roller reaction principle described above. The machine 301 comprises a generally cylindrical housing 430 which surrounds the forward section of the carrier tube 400. The housing includes the cylindrical outer casing 122 through which the setscrews 124 are threaded. A rear wall 432 formed integrally therewith, and a removable front wall 434 normally held in place by screws 433

(FIGS. 3 and 5) threaded into holes which are tapped in bosses 431 formed on the interior surface of the casing 122. The rear wall 432 is formed with a forwardly extending central bearing hub 436 within which is an annular bushing 438 surrounding the central portion of the carrier tube 400 in a manner to support the tube 400 while permitting both axial and rotational movement thereof. Since bearing hub 436 is located centrally of the tube 400 and is axially elongated, no other bearing for the carrier tube is required. The housing 430 thus supports the entire weight of tube 400 and all parts mounted thereon. The housing 430 in turn rests on a pedestal 437 and base 435. In order to retain lubricating oil within the housing 430, a resilient sealing member 440 is seated within an outer hub 442 of the rear wall 432, and surrounds the carrier tube 400. For a similar purpose the forward section of the carrier tube is surrounded by a resilient sealing member 444 contained within an outer hub 446 formed upon the housing front plate 434.

In order to correlate the axial and rotational components of motion of carrier tube 400 so as to produce helical movement at a precisely controlled pitch angle, the housing front plate 434 is formed with three pairs of bosses 416 and 417 which project into the interior of the housing 430, which corresponds to the journal blocks 116 in FIG. 1. The bosses 416 and 417 of each pair are formed with radially aligned journal openings 450 and 452 respectively which rotatably receive the roller holders 114. The roller holders are bifurcated at their inner ends to receive the roller wheels 104, which are rotatably mounted thereon by means of the roller shafts 106. Thus the rotational movement of the holders 114 within their journal sockets 450 and 452 serves to adjust the pitch angle of the rollers 140 relative to the axis of the carrier tube 400. The roller holders 114 are also radially movable toward and away from the carrier tube 400 within their journal sockets 450 and 452, so as to move the rollers 104 toward the outer surface of the carrier tube. Setscrews 120 and 124 thread through the outer casing wall 122 in two locations, and make point contacts with two of the roller holders 114 in order to advance the associated rollers 104 into contact with the outer surface of the carrier tube 400. Locknuts 454 are threaded on the setscrews 124 and engage the outer surface of the housing wall 122 in order to lock the setscrews 124 in place after the desired adjustment thereof has been achieved. The third roller holder 114 is similarly urged radially inward toward the carrier tube 400 by point contact with a movable plunger 456 which is resiliently urged in the radially inward direction by a coil spring 458 compressed between the plunger 456 and a cap 460 which surrounds spring 458 and is threaded through the housing wall 122. The spring 458, exerting resilient pressure radially upon its associated holder 114, roller 104, and the carrier tube 400, serves to equalize the pressure exerted thereon by all three of the rollers 104. The cap 460 provides a pressure adjustment, since tightening of the cap relative to the housing wall 122 alters the degree of compression of spring 458.

All three of the roller holders 114 have pinions 118 which surround them and are keyed thereto by key members 462, as seen in FIG. 4A. The pinions 118 thus rotate with the roller holders 114 for driving engagement therewith to effect adjustment of the helical pitch angle. The pinions 118 are beveled, and mesh with the common ring gear 120 which is similarly beveled. The ring gear maintains the pinions 118 in proper relative position to each other so that all three of the rollers 104 are oriented at the same pitch angle at any adjustment therefore, and it also provides a common input for simultaneous adjustment of the helical pitch angle of all three rollers 104.

In order to impart the required adjusting motion to the ring gear 120, there is provided a fourth pinion 470 which meshes with the ring gear 120 and is pinned to a shaft 472 for rotation therewith by means of a pin member 474. The shaft 472 is received within radially aligned journaling sockets 476 and 478 which are formed in bosses 480 and 482 respectively which project into the interior of the housing 430 from the front plate 434. An extension of the shaft 472 protrudes outside the casing 430 through an opening 484 provided for that purpose in the housing outer wall 122. Outside the housing 430 the extension of the shaft 472 has an adjustment handle 486 which is secured thereto for rotation therewith by means of a pin 488. The handle 486 can be manually rotated to drive the shaft 472 and pinion 470, so as to impart a roller-adjusting displacement to the ring gear 120.

The degree of displacement may be read by means of pointer 490 (FIG. 7) which scans across a dial plate 492 as the adjusting handle 486 is turned, to indicate the magnitude and direction of roller pitch angle. For example, when the pointer 490 is in its centered position as indicated by the dashed line position of FIG. 7, it points to a "zero" upon the dial plate 492, indicating that the rollers 104 are parallel to the axis of the carrier tube 400, and thus do not impart any helical component to the motion of the carrier tube at all. The arrow 496 inscribed upon the dial plate 492 and the accompanying indicia "L.H." indicate that the clockwise direction of rotation of the handle 486 imparts a left-hand helical pitch to the rollers 104, up to an extreme of 90° as indicated by the marking upon the dial plate. Similarly, arrow 700 and the accompanying dial indicia "R.H." indicate that the counterclockwise direction of adjustment handle 486 produces a right-hand helical pitch angle, up to the extreme of 90°, as indicated by the printed indicia on the dial plate 492. Within the two dial plate areas 704 there may be provided protractor markings to indicate the intermediate roller pitch angle adjustments to a high degree of precision.

After the desired adjustment has been achieved, a setscrew 706 which threads through the front plate 434 and the boss 480, as seen in FIG. 4A, is used to engage a reduced-diameter portion 708 of the adjusting shaft 472 in order to lock the adjusting mechanism in place.

During its adjusting motion, the ring gear 120 rotates upon an annular backup ring 500 which supports the weight of the ring gear and also exerts axial pressure thereon to keep the ring gear in engagement with the pinions 118 and 470. The backup ring 500 must permit the ring gear 120 to rotate relative thereto in order to perform its roller-angle-adjusting motion, and for this purpose the right 500 is received rotatably within a socket 502 (FIG. 4A) formed in the rear wall of the gear 120. In order to press the ring gear 120 forwardly into engagement with the pinions, it is biased axially forward by a plurality of coil springs 504 which are received within sockets 506 formed in the backup ring 500 immediately behind each of the roller adjustment pinions 118. The springs 504 are in compression between the end walls of the sockets 506 and an annular partition 508 formed in the interior of the housing 430.

The backup ring 500 is supported upon a plurality of mounting pins 510 which are located at spaced locations between the roller adjustment pinions 118. These pins are tightly received by either the backup ring 500 or the housing partition 508 and loosely received by the other of those two elements, in order to permit the backup ring 504 to be urged axially forward relative to the partition 508 by the pressure of the coil springs 504, thus urging the ring gear 120 into meshed relationship with the pinions 118 and 470. The weight of the backup ring 500, and of the ring gear 120 carried thereby, is borne by a boss 512 which projects axially forward from the partition 508 and loosely surrounds the ring 500 so as to support it without restricting its axial movement. The annular shape of the ring gear 120, backup ring 500, and housing partition 508 provides a central clearance space for the motion of the carrier tube 400.

The construction just described has advantages in the assembly of the machinery 301. Before the front plate 434 and its associated elements are put in place, the front opening of the housing 430 is accessible for installation of the backup ring 500 and ring gear 120, and the rear surface of the front wall 434 is accessible for installation of the rollers 104, roller holders 114, pinion shaft 472 and pinion 470. Then the housing front plate 434, with the latter components already mounted thereon, is put in place over the housing 430, simultaneously meshing the pinions 118 and 470 with the ring gear 120. The opening 484, which is formed in the housing outer wall 122 to accommodate the adjusting shaft 484, is axially elongated toward the front of the housing, as indicated at 520 in FIG. 4A, to provide an insertion channel through which the adjustment shaft 472 reaches the opening 484 when the front plate 434 and its associated components are put in place. The central opening 522 formed in the front housing wall 434 permits the carrier tube 400 to be installed later, after which the setscrews 124 and the pressure-adjusting cap 460 are advanced radially inward for properly positioning the rollers 104 relative to the carrier tube.

In order to mount the milling tool 303 within the carrier tube 400, there is provided a chuck 530 having a central opening 532 within which the milling tool 315 is received, and a plurality of radially movable jaws 534 is formed with a flared ramp 536 which causes the jaws 534 to be cammed radially inwardly when the chuck 530 is drawn into the interior of an inner tube 538. The inner tube is formed with an internal camming slope 540 at the mouth thereof to cooperate with the flared surfaces 536 in this camming operation. In order to draw the chuck 530 into the interior of the inner tube 538, the rear end of the chuck is provided with male threaded extension 542 which mates with a female threaded socket 544 of a cylindrical drawtube 546 extending rearwardly through the interior of the inner tube 538. A handwheel 548 is secured to the drawtube 546 for rotation therewith by means of a pin 550.

The milling tool 315 is inserted within the chuck socket 532, and the chuck 530 is then inserted into the front end of the inner tube 538. Next the draw tube 546 is inserted forwardly through the inner tube 538 until the socket 544 engages the threaded extension 542 of chuck 530. Then the handwheel 538 is rotated clockwise, as indicated by arrow 552 in FIG. 3, to thread elements 542 and 544 together, drawing the male element 542 axially into the female element 544 while the drawbar 546 is held stationary against the rear end surface 554 of the inner tube 538 by means of a hub 556 formed on the handwheel 548. As the male element 542 is drawn into the socket 544, it pulls the chuck 530 into the interior of the inner tube 538, causing the camming surfaces 540 and 536 to cooperate so that the chuck jaws 534 are forced radially inward to grip the milling tool 315. The engagement of surfaces 536 and surface 540, and the engagement of hub 556 against the end surface 554, serves also to secure the chuck 530 to the inner tube 538.

Once the milling tool 315 has thus been secured within the chuck 530, and the chuck has been secured within the inner tube 538, then the milling tool is then held in coaxial relationship with the inner tube 538. This is true because the tool-receiving socket 532 is positioned coaxially of the chuck 530, and the chuck in turn is received coaxially within the inner tube 538. Moreover, the pressure exerted by the camming surface 540 upon the chuck jaws 534 is uniform about the circumference of the chuck 530, thus causing the jaws to preserve the coaxial relationship as they are forced radially inwardly against the milling tool 315. A keying screw 560 is threaded radially inwardly through a tapped hole in the wall of the inner tube 538, and engages a keyway 562 formed in the chuck 530 in order to lock the chuck against rotation relative to the inner tube. This screw 560 is deliberately made too short in relation to the depth of the keyway 562 so as not to exert any radial force upon the chuck, which might disturb the precise coaxial alignment between the chuck and the inner tube. Finally, the inner tube 538 is coaxially received within the carrier tube 400, with the result that the milling tool 315 is also held in coaxial relation to the carrier tube.

Thus if the carrier tube 400 and inner tube 538 are advanced helically as a unit, the milling tool 315 will be similarly advanced coaxially therewith, and the strict control of helical pitch angle which is imposed upon the carrier tube 400 by the rollers 104 will also be imposed upon the milling tool, causing it to advance across the grinding surface of the wheel 305 in the desired manner.

The mechanism which locks the carrier tube 400 and inner tube 538 together for joint axial and rotational movement is a detenting mechanism 600, best seen in FIGS. 4B and 6, which is located at the tailstock section of the machine 301. The detenting mechanism includes a yoke 602 which surrounds the rear end of the carrier tube 400 and is clamped to the carrier tube for rotation therewith by means by a bifurcated lower end 604 having a setscrew 606 which draws the bifurcated elements together for clamping purposes. In addition, there is a seating ring 608 surrounding the inner tube 538 immediately behind the rear end of the carrier tube 400. The ring 608 is formed with a radial flange 617, and is secured to the inner tube 538 for both axial movement and rotation therewith by means of a locking screw 610 which threads through tapped holes in the ring 608 and in the inner tube 538. Note that the locking screw 610 is intentionally made too short to exert any radial pressure upon the drawtube 546, which might disturb the coaxial relation of parts described above.

Secured to the flange 617 by means of screws 614 is a ratchet ring 616 which annularly surrounds the seating ring 608 and is formed with teeth 618 entirely about its outer periphery. The yoke 602 is provided with a rearwardly extending boss 620 having an opening 624 within which a ratchet-engaging pawl 622 is mounted for vertical movement. A reduced-diameter vertical shaft 626 is integral with the pawl 622 and extends upwardly therefrom through an insert 628 threadedly received in the boss opening 624. A coil spring 630 is in compression between the lower surface of the insert 628 and the upper surface of the pawl 622, to urge the pawl downwardly into engagement with the ratchet teeth 618. A limiting pin 632 passes through a suitable opening in the shaft 626 and abuts against the upper surface of the plug insert 628 to limit downward movement of the shaft 626 and pawl 622, the pin 622 in its lowermost position being received within a slot 634 formed in the insert 628 so as to lock the pawl against rotation.

The detenting mechanism 600 just described locks the inner tube 538 and carrier tube 400 together for joint rotational movement whenever the pawl 622 engages the ratchet teeth 618. Moreover, the seating ring 608 impinges upon a bearing ring 692 which in turn engages the rear end of the carrier tube 400. Thus, wherever the inner tube 538 is driven axially forwardly, or the carrier tube 400 is driven axially rearwardly, the two tubes move axially as a unit. It follows that, during sharpening of the milling tool 315, the operator can grasp the yoke 602, drawing the carrier tube 400 rearwardly, causing the inner tube 538 to be drawn rearwardly along with it. Such axial translation of the carrier tube 400 causes the reaction of the rollers 104 to induce a properly proportioned rotational motion of the carrier tube, resulting in helical motion of tube 400 at the desired pitch angle. The rotary component of this helical motion is transmitted through the yoke 602, pawl 622, ratchet ring 616, flange 617 and seating ring 608 to the inner tube 538, so that the inner tube partakes of the rotary aspect of the helical motion of the carrier tube 400. By virtue of the keying connection provided by the screw 560, the chuck 530 also partakes of the rotational movement of the inner tube 538. The chuck also shares its axial motion, owing to the fact that the chuck jaw surfaces 536 are wedged against the inner tube ramp 540. The milling tool 315 of course shares the motion of the chuck 530, due to the fact that it is tightly gripped by the jaws 534. Accordingly, the milling tool moves jointly and coaxially with the carrier tube 400 through its helical advance.

There are various ways in which the carrier tube 400 can be manually driven so as to secure the desired reaction at the rollers 104, and the desired helical motion of the milling tool 315. One method, described above, is to draw the carrier tube 400 rearwardly by pulling back on the yoke 602. Alternatively, the operator can push forwardly on a handwheel 650 having a hub 652 which surrounds the inner tube 538 and is secured thereto for joint axial and rotational movement by means of a locking screw 564 tapped radially through the hub 652 and into an opening formed in the inner tube 538. Note that the locking screw 564 is short enough that it does not exert any radial force upon the drawtube 546, so as not to disturb the coaxial relationship of parts described above.

These two methods of operating the device, i.e. moving the carrier tube 400 axially rearwardly or the inner tube 538 axially forwardly, are preferred when the rollers 104 are set for a relatively low pitch angle, i.e. somewhere between 0° and 45° of either left-hand or right-hand pitch. But when the pitch angle in either direction is adjusted to exceed 45° it is easier to apply a rotary motion to the carrier tube 400, and depend upon the reaction of the roller wheels 104 to impart the axial component of motion thereto. In those circumstances the operator manually rotates the handwheel 650 either clockwise or counterclockwise to rotate the inner tube 538. The indexing mechanism 600 causes the carrier tube 400 to rotate therewith, and the rollers 104 then react against the carrier tube to produce helical motion having the appropriate axial component. Care must be taken to turn the handwheel 650 in the correct angular direction, relative to whether the rollers 104 are set for a left-hand or right pitch, so that the axial motion imparted to the carrier tube 400 is directed rearwardly, causing the bearing 692 to impinge upon the seating ring 608 and the inner tube 538 to be driven rearwardly along with the carrier tube. In this way the carrier tube 538 shares both the axial and rotational components of the helical motion of carrier tube 400, and imparts that motion to the milling tool 315.

During sharpening of the milling tool, the forward and rearward limits of the axial stroke of the carrier tube 400 are set in accordance with the axial length of the cutting edges by employing stroke-limiting collars 660 and 662 respectively. The collar 660 has a fixed position near the front end of the carrier tube 400, and is secured thereto by a setscrew 664 having a point which is received within an appropriately shaped recess on the surface of the carrier tube. The collar 660 sets a fixed rearward limit to the axial displacement of the carrier tube 400 by impinging upon the boss 446. The other collar 662 loosely surrounds the rearward portion of the carrier tube 400 so as to be adjustable along the length thereof. It has bifurcated ends 666 which can be tightened by means of a setscrew 668, so that when the desired position for the collar 662 has been found, the setscrew 668 is tightened to clamp the bifurcated ends 666 together and secure the collar 662 to the carrier tube 400. Then the collar 662 impinges upon the boss 442 when the carrier 400 is advanced to the forward limit of its axial stroke.

It will now be clearly understood that a particular cutting edge 307 of the milling tool 315 can be helically traversed across the grinding surface of the wheel 305 to sharpen it all along its length. In order to sharpen the remaining cutting edges 309, 311 and 313 as well, it is necessary to impart successive quarter turns to the milling tool 315 relative to the carrier tube 400 so as to rotate each one of the four flute-cutting edges in turn into grinding relationship with the wheel 305. This is accomplished by pulling up on a release knob 680 which is secured to shaft 626 of the detenting pawl 622. This releases the pawl from engagement with the ratchet teeth 618, permitting the operator to rotate the inner tube 538, the seating ring 608 and the ratchet ring 616 relative to the pawl 622, yoke 602 and carrier tube 400. Such rotation can be most conveniently accomplished by turning the handwheel 650 during the time that the ratchet release knob 680 is held in its upper position. After the appropriate angular adjustment of the inner tube 538 has been made, the knob 680 is released, allowing the pawl shaft 626 and pawl 622 to be driven downwardly once again by the coil spring 630 until the pawl 622 reengages the ratchet teeth 618 and the limiting pin 632 strikes the bottom of the slot 634 to limit the downward motion.

The number of ratchet teeth in the ring 616 is preferably selected to be evenly divisible by any number of helical cutting edges which a milling tool is likely to have. In the specific example give, all four cutting edges of the milling tool 315 can be sharpened if the detenting mechanism 600 is arranged to detent inner tube 538 in four equally spaced angular positions 90° apart relative to the carrier tube 400, but other milling tools may have different number of detented positions. The rotational movement of the inner tube 538 relative to the carrier tube 400 during angular indexing is facilitated by a pair of oil-impregnated sintered metal bearings 690 and 692 which journal the carrier tube 400 upon the inner tube 538 at the front and rear ends of the carrier tube respectively. The front bearing 690 is retained in place by a ring 694 which surrounds the front end of the inner tube 538 and is welded or otherwise affixed thereto, while the rear bearing 692 is retained in place by the seating ring 608.

This detenting mechanism 600 thus provides the capability of shifting the jig mechanisms of the invention to produce helical traversing movement of the cutting tool or workpiece secured in the carrier tube 400 along different, angularly displaced "twisted helical traverse planes."

While universally mounted ball bearings may comprise several of the rolling supports for the cylindrical member 100 or 400, at least one rolling support must be a roller 104 having a plane of rotation adjustable about an axis substantially coinciding with a radius of the cylindrical member, such as the radial axis 105 defined by the tangent point of each roller 104 on cylinder 100 and the centerline of each shaft 114 in FIG. 1. As cylindrical member 100 sweeps past roller 104, radial axis 105 thus generates the "twisted helical traverse plane" of movement of member 100. For this reason, at least one of the rolling members must be a tractive roller 104 with an adjustment axis 105 in order to select and define the twisted helical traverse plane, and to guide the cylinder firmly and reliably along the helical traverse path thus defined. Accordingly a plurality of rollers 104 provides better guiding action than one roller 104 can provide.

It will now be readily understood that the present invention provides an improved device for presenting an end mill or other tool having helically fluted cutting edges in sharpening traversing engagement with a grinding wheel, and helically traversing the length of each cutting edge across the grinding surface of the wheel for sharpening along its entire length. The apparatus of this invention accomplishes these objective with precision so far as control and adjustment of the helical pitch angle are concerned, and it also provides greater ease of assembly of the mechanism, and an improved way of indexing the cutting tool angularly to bring one cutting edge after another into sharpening position.

Since the foregoing description and drawings are merely illustrative, the scope of the invention has been broadly stated herein and it should be liberally interpreted so as to obtain the benefit of all equivalents to which the invention is fairly entitled.

What is claimed is:

1. Apparatus for moving a cutting tool helically past an edge-sharpening device, said apparatus comprising:
   a. a generally cylindrical tool carrier member;
   b. means on said carrier member arranged to hold said cutting tool in such position that the axis of said helical cutting edge thereof substantially coincides with the axis of said cylindrical carrier member;
   c. means movably supporting said carrier member for both translation parallel to, and rotation about, its cylindrical axis, said means including a plurality of freely rotatable, nondriven guide rollers located externally of said carrier member and spaced circumferentially thereabout, and means mounting each of said rollers for rotation in tractive rolling engagement against the exterior of said carrier member in a selected skew plane rotating about roller axes each angularly displaced from the axis of the cylindrical carrier member by substantially the same adjusted skew angle;

d. common skew-angle-adjusting means for simultaneously adjusting said skew angles while maintaining them substantially equal; and e. separate means independent of said roller and said adjusting means for moving said carrier member by imparting at least one component of helical motion thereto, to advance said tool helically, whereby said rollers react thereagainst to impart a helical direction motion of said carrier member so as to move said cutting tool along a helical path of advance at an adjusted helix angle.

2. Apparatus as in claim 1 wherein:
said skew angle of the plane of rotation of said rollers is selected to be substantially equal to the helix angle of said helical cutting edge, whereby to traverse the length of said helical cutting edge edgewise past a fixed edge-sharpening location.

3. Apparatus as in claim 1 further comprising:
means for adjusting the skew angle of said rollers to match different helix angles of cutting edge of different tools, wherein the adjusting means is installed in resiliently biased antibacklash engagement with all of said rollers, positioning them at substantially equal adjusted skew angles.

4. Apparatus as in claim 3 wherein said roller mounting and common skew-angle-adjusting means comprise:
a holding member for each of said rollers; means mounting said holding members for rotation about respective axes each coinciding with a radius of said cylindrical tool carrier member; means on said holder members mounting said rollers for rotation about roller axes which are perpendicular to said radially oriented holder axes; and roller skew-angle-adjusting means connected to produce simultaneous equal rotary adjustment of all of said holding members about their radial holder axes;
producing simultaneous rotation of said holder members about said radially oriented axes and thereby simultaneously sweeping the rotation planes of said rollers through substantially identical skew angles relative to the axis of said cylindrical tool carrier member ranging from +90° through 0° to —π°.

5. Apparatus as in claim 4 wherein said roller mounting and adjusting means further comprises:
pinions rotatable with said holding member about said radially oriented axes;
gear means engaging said pinions;
means mounting said gear means for traversing movement to rotate said holding members;
and means for driving said gear means in said traversing movement whereby to adjust the skew angle of said rollers.

6. Apparatus as in claim 5 comprising:
means linking said rollers together to assume substantially equal skew angles in all adjusted positions thereof.

7 Apparatus as in claim 5 wherein:
said pinions are arranged at substantially the same radial distance from said cylindrical carrier member;
and said gear means comprises a single ring gear simultaneously engaging all of said pinions for simultaneous adjustment of all of said rollers.

8. Apparatus as in claim 7 wherein said gear driving means comprises:
an additional pinion drivingly engagingly said ring gear;
means mounting said additional pinion for rotation to drive said ring gear;
and manually operable means for driving said additional pinion to adjust said rollers.

9. Apparatus as in claim 8 further comprising:
a housing surrounding said cylindrical tool carrier member;
said roller holders, said additional pinion, and said ring gear being mounted upon said housing in encircling relationship to said carrier member.

10. Apparatus as in claim 9 wherein:
said housing comprises a cylindrical casing located radially outwardly of said tool carrier member, and a plate at one end of said cylindrical casing cooperating therewith to define an enclosure;
said casing having means thereon for rotatably mounting said ring gear within said enclosure;
and said plate having means thereon for mounting said roller holders and said additional pinion within said enclosure whereby said pinions are assemblable with said ring gear upon assembly of said plate with said casing.

11. Apparatus as in claim 9 wherein said manually operable means for driving said additional pinion comprises:
a shaft extending outside said housing;
and a manual drive handle affixed to said shaft and located outside said housing.

12. Apparatus as in claim 9 wherein:
said means supporting said cylindrical carrier member comprise bearing means on said housing.

13. Apparatus as in claim 9 further comprising:
means for adjusting the position of said roller holders radially relative to said housing.

14. Apparatus as in claim 13 further comprising:
means exerting resilient pressure radially inward on at least one of said roller holders.

15. Apparatus as in claim 9 further comprising:
stroke-limiting means affixed to said carrier member and positioned for abutting limiting contact with said housing to limit axial motion of said carrier member in at least one direction.

16. Apparatus as in claim 15 wherein:
said stroke-limiting means is situated outside said housing and includes means for adjusting its axial position on said carrier member whereby to adjust the limits of the axial stroke thereof.

17. Apparatus as in claim 15 further comprising:
additional stroke-limiting means affixed to said carrier member and positioned for opposite abutting limiting contact with said housing to limit axial motion of said carrier member in the opposite direction.

18. Apparatus as in claim 1 for use with a cutting tool having a plurality of helical cutting edges circumferentially displaced from each other, wherein:
said toolholding means is arranged for indexingly rotating said tool about the cylindrical axis of said carrier member whereby to position different ones of said cutting edges adjacent said edge-sharpening device.

19. Apparatus as in claim 18 further comprising:
means for detenting the rotary motion of said cutting tool in a plurality of angular positions corresponding to different ones of said cutting edges.

20. Apparatus as in claim 19 wherein:
said cylindrical tool carrier member is hollow;
said toolholding means comprises a generally cylindrical inner body disposed coaxially within the interior of said carrier member and rotatable relative thereto for indexingly rotating said tool;
and said detenting means is arranged to lock said inner body against rotation relative to said carrier member at a plurality of discrete angular index positions relative thereto.

21. Apparatus as in claim 20 wherein said detenting means comprises:
interengaging male and female means;
one of said interengaging means being affixed to said carrier member and the other to said inner body;
one of said interengaging means being resiliently disengageable from the other for rotating said inner body to select a new angular position for said tool relative to said carrier member;
and one of said interengaging means extending circumferentially about the other to provide a range of such angular positions.

22. Apparatus as in claim 20 wherein said toolholding means further comprises:

a generally cylindrical tool chuck comprising radially openable and closeable jaws for gripping said cutting tool therebetween;

said cylindrical inner body being hollow;

said chuck being coaxially disposed within the interior of said inner body;

said chuck jaws and said inner body being formed with interengaging cam means for forcing said jaws radially inward in a closing motion whereby to grip said tool when said chuck enters the interior of said inner body.

23. A mechanism for producing adjustable helix angle helical movement of a cylindrical member about its own axis relative to said mechanism comprising:

a. means movably supporting said cylindrical member for translation parallel to, and rotation about its cylindrical axis;

b. a plurality of freely rotatable, nondriven guide rollers;

c. means rotatably mounting said rollers in tractive rolling engagement with the cylindrical member at circumferentially spaced locations thereabout, said mounting means including means forming a corresponding plurality of shafts defining definite axes of rotation each substantially perpendicular to radii of the cylindrical member for all of said rollers and each angularly offset from the axial plane defined by its radius and the cylindrical axis by substantially identical skew angles;

d. driving means independent of said rollers for producing relative rolling motion between said rollers and said cylindrical member, whereby the rollers impart to said cylinder a helical motion about its own axis at a helix angle determined by the skew angle between the axis of said cylinder and said definite axes of roller rotation;

e. and separate means operable simultaneously with and independently of said driving means for selectively and simultaneously adjusting said skew angles by simultaneously rotating said shafts about said respective radii whereby to select said adjusted helix angle.

24. The mechanism defined in claim 23, wherein said driving means comprises a member by which a force is applied manually to said cylindrical member in a direction to impart at least one component of helical motion thereto, whereby to produce said relative rolling motion.

25. The mechanism defined in claim 23 further comprising means whereby at least one of the rolling members is radially adjustable relative to said cylindrical member to change the tractive forces acting radially between the cylindrical member and said one rolling member.

UNITED STATES PATENT OFFICE
CERTIFICATE OF CORRECTION

Patent No. 3,600,860              Dated August 24, 1971

Inventor(s) Warren Harding Liepold

It is certified that error appears in the above-identified patent and that said Letters Patent are hereby corrected as shown below:

In the Abstract, Line 4, change "the" to --The--
In the Abstract, Line 6, change "grinding mill" to --grinding wheel--
Column 1, Line 54, change "finger" to --fingers--
Column 3, Line 8, change "rolling-" to --rolling--
Column 3, Line 53, change "described" to --describe--
Column 4, Line 42, change "ta" to --a--
Column 5, Lines 24-25, change "corresponds" to --correspond--
Column 6, Line 43, change "right 500" to --ring 500--

Column 7, Line 19, after "534" insert --which surround and grip the milling tool. The exterior of each jaw 534--
Column 10, Line 8, after "different" insert --numbers of cutting edges and thus require a different--
Column 10, Line 46, change "objective" to --objectives--
Column 11, Line 4, change "roller" to --rollers--
Column 11, Line 9, after "direction" insert --to--
Column 11, Line 21, change "edge" to --edges--
Column 11, Line 42, change "$\pi$°" to --90°--
Column 11, Line 45, change "member" to --members--
Column 11, Line 65, change "engagingly" to --engaging--

Signed and sealed this 14th day of March 1972.

(SEAL)
Attest:

EDWARD M. FLETCHER, JR.          ROBERT GOTTSCHALK
Attesting Officer                 Commissioner of Patents